United States Patent
Nielsen

(10) Patent No.: US 9,722,459 B2
(45) Date of Patent: Aug. 1, 2017

(54) APPARATUS AND METHOD FOR PROVIDING UNINTERRUPTIBLE POWER

(75) Inventor: Henning Roar Nielsen, Brenderup (DK)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 391 days.

(21) Appl. No.: 14/406,863

(22) PCT Filed: Jun. 12, 2012

(86) PCT No.: PCT/US2012/042048
§ 371 (c)(1),
(2), (4) Date: Dec. 10, 2014

(87) PCT Pub. No.: WO2013/187883
PCT Pub. Date: Dec. 19, 2013

(65) Prior Publication Data
US 2015/0180279 A1  Jun. 25, 2015

(51) Int. Cl.
*H02J 9/00* (2006.01)
*H02J 9/06* (2006.01)
(Continued)

(52) U.S. Cl.
CPC ............. *H02J 9/062* (2013.01); *H02M 1/126* (2013.01); *H02M 5/4585* (2013.01); *H02M 7/487* (2013.01); *Y10T 307/615* (2015.04)

(58) Field of Classification Search
USPC ........................................................ 307/64
See application file for complete search history.

(56) References Cited

U.S. PATENT DOCUMENTS 6,838,925 B1  1/2005  Nielsen
8,053,927 B2  11/2011  Hjort et al.
(Continued)

FOREIGN PATENT DOCUMENTS

CN  101197547 A  6/2008
EP  1858149 A1  11/2007
(Continued)

OTHER PUBLICATIONS

Extended European Search Report from corresponding European Application No. 12879127.4 dated Dec. 8, 2015.
(Continued)

*Primary Examiner* — Rexford Barnie
*Assistant Examiner* — Dru Parries
(74) *Attorney, Agent, or Firm* — Lando & Anastasi, LLP

(57) ABSTRACT

Systems and methods of controlling an uninterruptible power supply are provided. The uninterruptible power supply includes an input configured to receive input power, an output, a power conversion circuit coupled with the input and the output, and a controller coupled with the power conversion circuit. The power conversion circuit includes an inverter, which includes a low pass filter. The low pass filter includes an inductor, and the controller is configured to provide control signals to the inverter such that a first current, measured at the inductor, generates a second current, measured at the output, where the first current has a first polarity and the second current having a second polarity, and the first polarity is either zero or the same polarity as the second polarity.

19 Claims, 10 Drawing Sheets

(51) Int. Cl.
*H02M 7/487* (2007.01)
*H02M 1/12* (2006.01)
*H02M 5/458* (2006.01)

(56) References Cited

U.S. PATENT DOCUMENTS

2006/0043792 A1  3/2006  Hjort et al.
2006/0044846 A1  3/2006  Hjort et al.
2011/0044077 A1  2/2011  Nielsen
2011/0227415 A1  9/2011  Hjort et al.
2011/0280055 A1  11/2011  Nielsen

FOREIGN PATENT DOCUMENTS

EP           2372893 A1   10/2011
WO    2009/074172 A1    6/2009

OTHER PUBLICATIONS

Notification of Transmittal of the International Search Report and the Written Opinion of the International Searching Authority from corresponding PCT/US2012/042048 dated Aug. 31, 2012.

US 9,722,459 B2

APPARATUS AND METHOD FOR PROVIDING UNINTERRUPTIBLE POWER

This application is a U.S. National Stage Application under 35 U.S.C. §371 from International Application No. PCT/US2012/042048, filed Jun. 12, 2012, which is hereby incorporated by reference in its entirety for all purposes.

BACKGROUND OF THE INVENTION

1. Field of Invention

At least one embodiment of the present invention relates generally to control of an uninterruptible power supply.

2. Discussion of Related Art

Uninterruptible power supplies (UPS) are used to provide reliable power to many different types of electronic equipment. Uninterruptible power supplies regulate power provided to a load, and can provide backup power to a load in the event of a loss of primary power, such as during black out or brown out conditions. Unwanted fluctuations in power provided to a load can waste energy and damage electrical equipment, which results in increased cost, a loss of productivity and can require repair or replacement of electrical components.

SUMMARY OF THE INVENTION

Aspects and embodiments described herein are directed to uninterruptible power supply control. At least one aspect is directed to an uninterruptible power supply including an input configured to receive input power, an output, a power conversion circuit coupled with the input and the output, and a controller coupled with the power conversion circuit. The power conversion circuit includes an inverter, which includes a low pass filter. The low pass filter includes an inductor, and the controller is configured to provide control signals to the inverter such that a first current, measured at the inductor, generates a second current, measured at the output, where the first current has a first polarity and the second current having a second polarity, and the first polarity is either zero or the same polarity as the second polarity.

The control signals can include pulse width modulated (PWM) signals. The inverter can be configured to operate in a discontinuous conduction mode when an average value of the second current is less than a predetermined threshold. The inverter can be further configured to operate in any of four quadrants. The control signals can further include four signals, each provided to one of four switches included in the inverter, respectively. The control signals can further be configured such that one of the four signals is a PWM signal, and the other three of the four signals are constant signals, the PWM signal alternating among the four signals.

The uninterruptible power supply can further include a control switch coupled to the controller and the inverter, and a backup power source coupled to the control switch, wherein the controller is configured to control the control switch to provide power to the inverter from at least one of the input and the backup power source. The uninterruptible power supply can further include a bypass switch coupled to the controller and configured to couple the input to the output in a bypass mode of operation of the uninterruptible power supply, wherein the inverter is configured to operate in a discontinuous conduction mode in the bypass mode of operation.

The power conversion circuit can be configured to provide reduced harmonic distortion.

Another aspect is directed to a method of distributing power using an uninterruptible power supply. The uninterruptible power supply includes an input, an output, and a power conversion circuit comprising an inverter comprising an inductor. The method includes controlling the inverter such that a first current, measured at the inductor, generates a second current, measured at the output, the first current having a first polarity and the second current having a second polarity, wherein the first polarity is either zero or the same polarity as the second polarity.

At least some of these aspects and embodiments are achieved by the methods and systems according to independent claim 1 and any other independent claims. Further details may be found in the remaining dependent claims.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification. The drawings, together with the remainder of the specification, serve to describe and explain the claimed aspects and embodiments.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
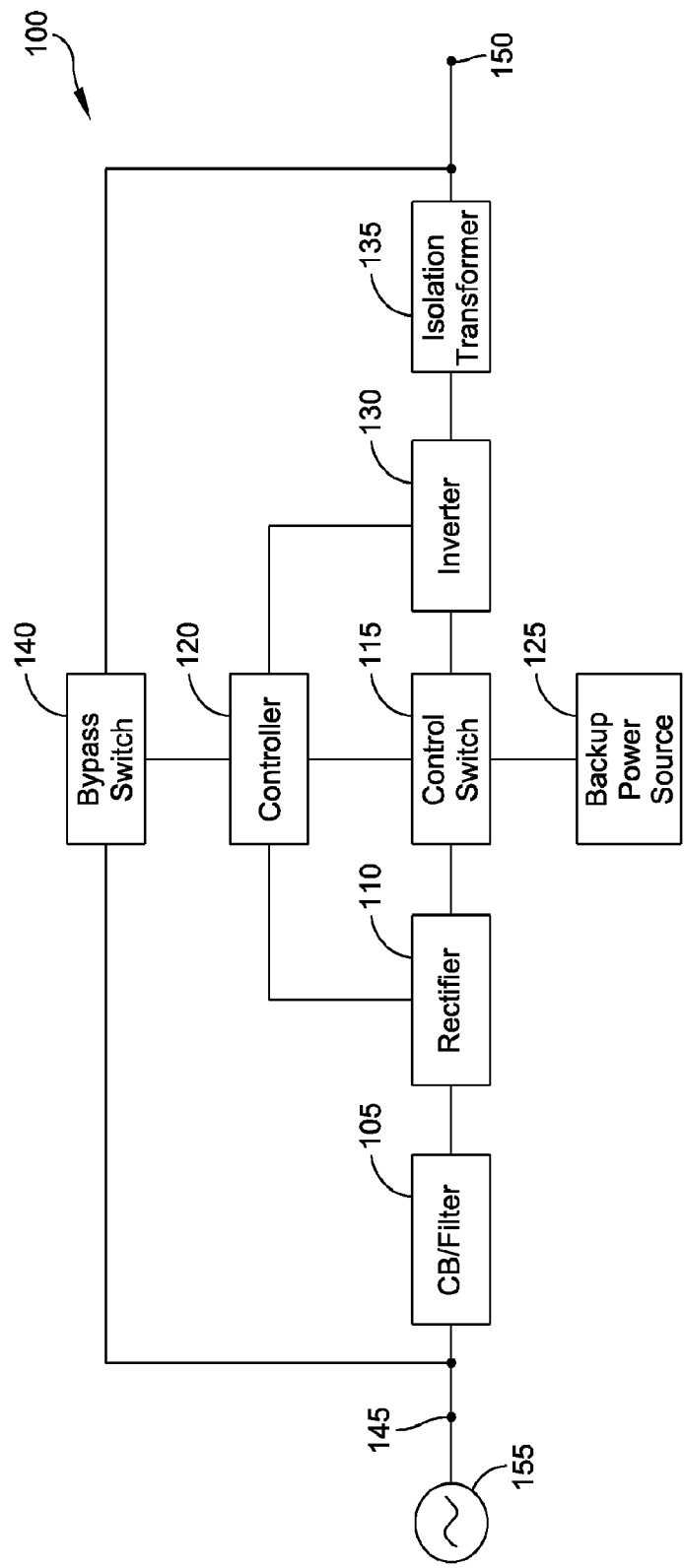
FIG. 1 is a functional block diagram depicting an uninterruptible power supply in accordance with an embodiment.

The systems and methods described herein are not limited in their application to the details of construction and the arrangement of components set forth in the description or illustrated in the drawings. The invention is capable of other embodiments and of being practiced or of being carried out in various ways. Also, the phraseology and terminology used herein is for the purpose of description and should not be regarded as limiting. The use of "including" "comprising" "having" "containing" "involving" and variations thereof herein, is meant to encompass the items listed thereafter, equivalents thereof, and additional items, as well as alternate embodiments consisting of the items listed thereafter exclusively.

Various aspects and embodiments are directed to uninterruptible power supplies. In one example, an uninterruptible power supply (UPS) may include an inverter, a controller, and a bypass switch. The controller operates the inverter during online operation to regulate the inverter output voltage and to provide output voltage from the inverter at the UPS output. The controller can also operate the inverter during bypass and other operation modes to provide, among other things, power factor correction, harmonic current distortion control, and active power to charge a backup power source. The controller can time the operation of switches in the inverter to provide output voltage.

FIG. 1 is a functional block diagram 100 depicting an uninterruptible power supply (UPS) 100. The uninterruptible power supply 100 includes power conversion circuitry such as a circuit breaker/filter 105, a rectifier 110, a control switch 115, a controller 120, a backup power source 125, an inverter 130, a transformer such as an isolation transformer 135, and a bypass switch 140. The uninterruptible power supply 100 also includes at least one input 145 and output 150. The input 145 couples an AC power source 155 with the uninterruptible power supply 100, and the output 150 couples the uninterruptible power supply 100 with a load.

In one embodiment, the circuit breaker/filter 105 receives power from the AC power source 155 via the input 145, filters this input AC power, and provides filtered AC power to the rectifier 110. The rectifier 110 rectifies the filtered AC power, and provides rectified power to the control switch 115. The control switch 115 receives the rectified power from the rectifier 110, and receives DC power from the backup power source 125, such as a battery or fuel cell. Under the control of the controller 120, the control switch 115 provides power from the rectifier 110 to the inverter 130. For example, the controller 120 changes the state of the control switch 115 to couple the rectifier 110 with the inverter 130 when the controller 120 determines that the output power of the rectifier 110 is within a tolerance range. In some embodiments, the controller 120 determines that the output power of the rectifier 110 is outside a tolerance range, for example, during a black out or brown out condition. In this example, the controller 120 operates control of the switch 115 to provide DC power from the backup power source 125 to the inverter 130 directly or via intervening components such as the rectifier 110. The uninterruptible power supply 100 also provides power at the output 150 for a load via the backup power source 125 during failure of the AC power source 155.

The inverter 130 receives DC power output from the rectifier 110 or the backup power source 125, converts the DC power to AC power, and regulates the AC power. In some embodiments where the uninterruptible power supply 100 includes the isolation transformer 135, the inverter 130 provides regulated AC power to the isolation transformer 135. The isolation transformer 135 increases or decreases the voltage of the AC power output from the inverter 130, and provides isolation between the uninterruptible power supply 100 and a load.

In some embodiments, the bypass switch 140 couples the AC power source 155 or the input 145 with the output 150, bypassing at least some components of the uninterruptible power supply 100, (e.g., the rectifier 110) to provide power to the output 150 in a bypass mode of operation. For example, the controller 120 controls the bypass switch 140 to operate in the bypass mode when input power from the AC power source 155 is within a tolerance range, or when there is a failure of the rectifier 110 or other component of the uninterruptible power supply 100.

Figure 2:
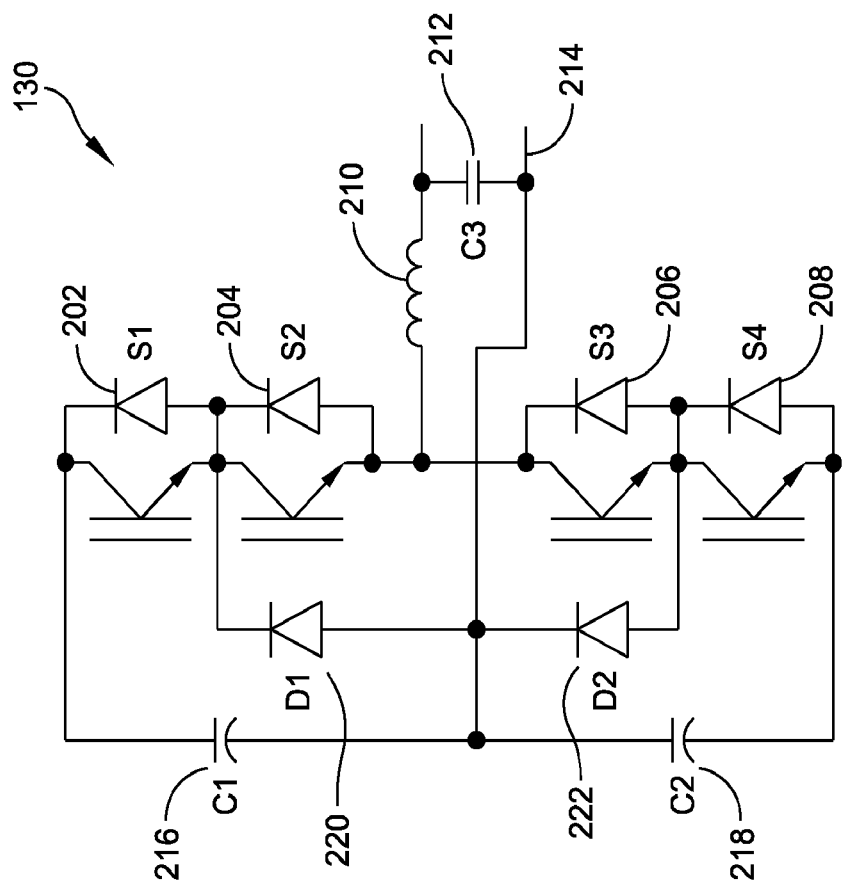
FIG. 2 is a schematic diagram depicting an inverter of an uninterruptible power supply in accordance with an embodiment.

FIG. 2 is a schematic diagram depicting a portion of the inverter 130 of an uninterruptible power supply in accordance with an embodiment. The inverter 130 includes four switches, S1 202, S2 204, S3 206, and S4 208. In some embodiments the switches 202, 204, 206, 208 are implemented as insulated gate bipolar transistors (IGBTs). In some embodiments, the switches 202, 204, 206, 208 each include a diode, configured as shown in FIG. 2. The inverter 130 also includes two diodes, D1 220 and D2 222, three capacitors, C1 216, C2 218, and C3 212, and an inductor 210. As shown in FIG. 2, capacitor C1 216 is coupled to switch S1 202, which is coupled to switch S2 204 and diode D1 220. Switch S2 204 and diode D1 220 are coupled to the inductor 210 and capacitor C3 212. The inductor 210 and the capacitor C3 212 constitute an LC low-pass filter, which allows the inverter 130 to produce a sinusoidal output at an output 214 of the inverter 130. Switch S2 204 and diode D1 220 are also coupled to switch S3 206 and diode D2 222. Switch S3 206 and diode D2 222 are coupled to switch S4 208, which connects to capacitor C2 218, which connects back to capacitor C1 216.

A controller, such as the controller 120, controls the operation of the inverter 130 using pulse width modulation (PWM). In some embodiments, the controller 120 includes at least one processor or other logic device. In some embodiments, the controller 120 includes a digital signal processor (DSP). The controller 120 may also include at least one field programmable gate array (FPGA) and an application specific integrated circuit (ASIC), or other hardware, software, firmware, or combinations thereof. In various embodiments, one or more controllers may be part of the UPS 100, or external to but operatively coupled with the UPS 100.

In some embodiments, the controller 120 includes at least one control signal generator. The control signal generator may be part of the controller 120 or a separate device that outputs a control signal responsive, at least in part, to instructions from the controller 120. In some embodiments, the control signal generator includes at least one DSP and an FPGA. The control signal generator may generate, form, or otherwise output a control signal such as a pulse width modulation (PWM) control signal.

Figure 3:
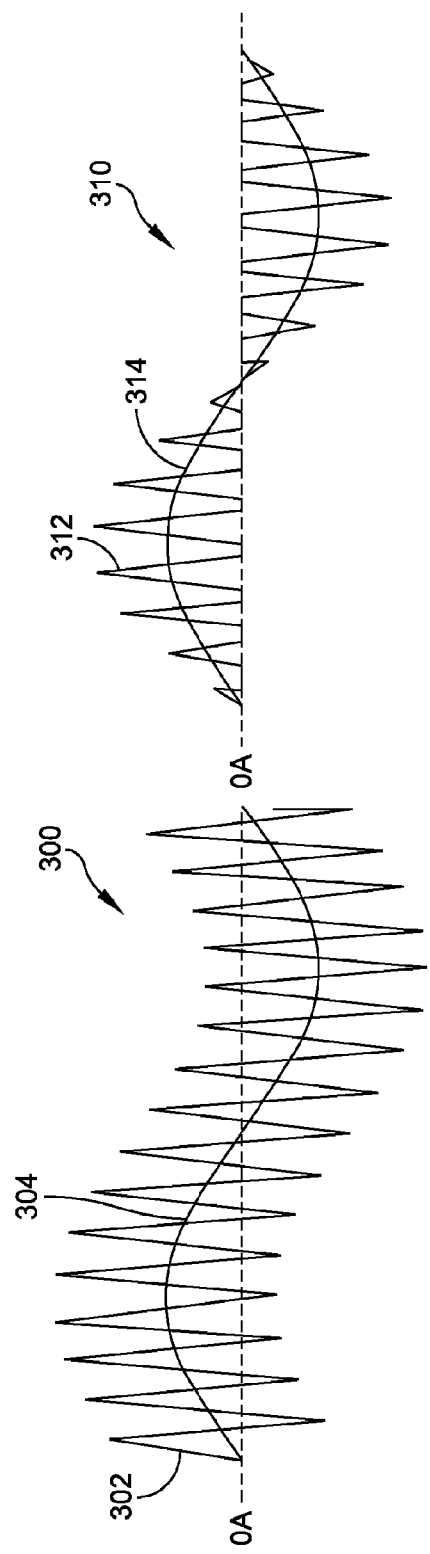
FIG. 3A is a graph depicting an output waveform of an uninterruptible power supply in accordance with the prior art.
FIG. 3B is a graph depicting an output waveform of an uninterruptible power supply in accordance with an embodiment.

In some embodiments, the controller 120 applies the PWM control signals to the switches 202, 204, 206, 208 to control the current generated by the inverter 130. Referring also to FIG. 3A, a prior art control method includes applying complimentary PWM control signals to the switches to generate an inductor current 302 to produce a load current 304. For example, in some prior art embodiments, complimentary PWM control signals are provided to switch S1 202 and switch S3 206 to toggle the two switches, separated by short dead times. Outside of the dead times, the complimentary PWM signals results in one of the switches S1 202 or S3 206 being closed. As a result, a current conducting path presents a voltage source feeding the LC filter, causing the inductor current 302 to be rising or falling.

Referring to FIG. 3B, a control method in accordance with an embodiment includes applying PWM control signals to the switches 202, 204, 206, 208 to generate an inductor current 312. The inductor current 312 produces a load current 314. The control method includes controlling the switches 202, 204, 206, 208 to restrict inductor current 312 from a direction opposite from the desired load current 314. As a result, the inductor current 312 is in a discontinuous conduction mode (DCM).

In the operation of prior art systems, such as shown in FIG. 3A, at lower loads, the load current can be close to zero amperes (A), resulting in the inductor current switching polarities to generate the load current if in a continuous conduction mode (CCM). As can be seen in FIG. 3A, the inductor current 302 at times becomes negative when the load current 304 is positive, and becomes positive when the load current is negative. At these times, the inductor current 302 is in an opposite direction from the load current 304. FIG. 3B shows an example control method where the inductor current 312 is either zero or in the same direction as the load current 314. Instead of passing in the opposite direction, the switches 202, 204, 206, 208 are controlled so that the inductor current 312 is cut off so that the inductor current 312 is discontinuous.

Figure 4:
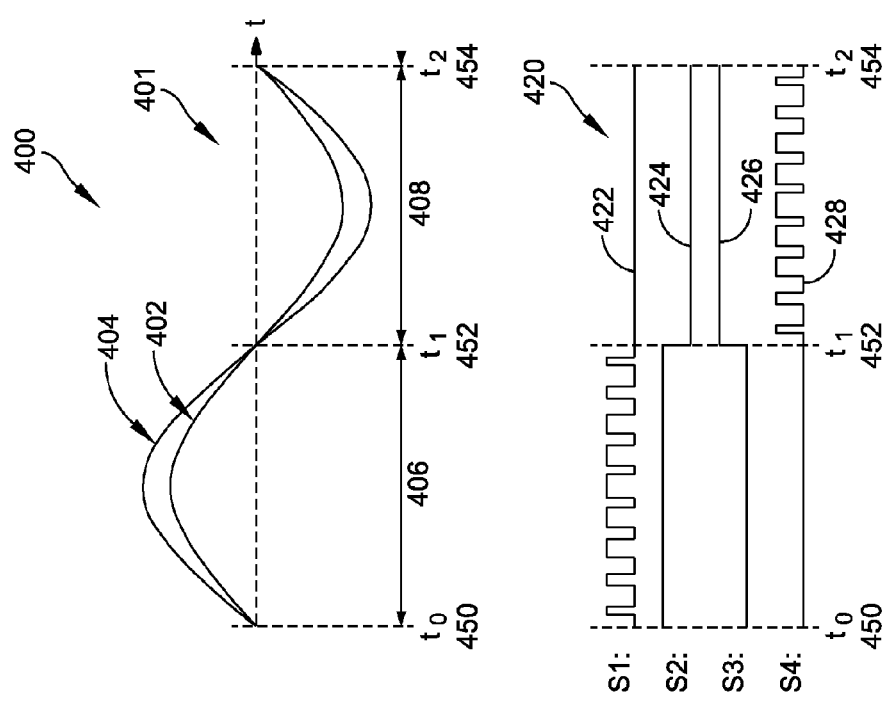
FIG. 4 is a diagram depicting control signals to an inverter of an uninterruptible power supply in accordance with an embodiment.

FIG. 4 is a diagram 400 depicting control signals to an inverter of an uninterruptible power supply in accordance with an embodiment. A graph 401 shows an output current 402 and an output voltage 404 for an example load. For example, the output current 402 and the output voltage 404 can be an example output measured at the output 214 of the inverter 130 of FIG. 2. The example output can be for a resistive load, providing an in-phase output current 402 and output voltage 404. A first section 406, from a time $t_0$ 450 to a time $t_1$ 452, shows operation of the inverter 130 in quadrant 1, where the output current 402 and the output voltage 404 both have a positive polarity. A second section 408, from time $t_1$ 452 to a time $t_2$ 454, shows operation of the inverter 130 in quadrant 3, where the output current 402 and the output voltage 404 both have a negative polarity.

In some embodiments, to generate the positive output current 402 and the positive output voltage 404 of the first section 406, corresponding PWM signals provided to the switches S1 202, S2, 204, S3, 206, and S4 208 are shown in a timing diagram 420. A first signal 422 is provided to control switch S1 202. From $t_0$ 450 to $t_1$ $t_1$ 452, the first signal 422 is a PWM signal, closing the switch when the first signal 422 is high and opening the switch when the first signal 422 is low. A second signal 424 is provided to control switch S2 204. From $t_0$ 450 to $t_1$ 452, the second signal 424 is a high signal, leaving switch S2 204 closed throughout the first section 406. A third signal 426 is provided to switch S3 206 and a fourth signal 428 is provided to switch S4 208. The signals 426, 428 are low from $t_0$ 450 to $t_1$ 452, leaving switches S3 206 and S4 208 open throughout the first section 406. Thus, in quadrant 1 operation, switches S3 206 and S4 208 remain open, switch S2 204 remains closed, and switch S1 202 is toggled on and off with the PWM signal. When switch S1 202 is on, current passes through the circuit created from capacitor C1 216 through switch S1 202, switch S2 204, and through the inductor 210 and capacitor C3 212 filter, to the output 214. When switch S1 202 is off, the current freewheels through the inductor 210, capacitor C3 214, diode D1 220, and switch S2 204. The operation of the circuit can be similar to that of a buck converter.

The timing diagram 420 continues to show corresponding signals provided to the switches S1 202, S2 204, S3 206, and S4 208 to generate the negative output current 402 and the negative output voltage 404 of the second section 408, according to some embodiments. From $t_1$ 452 to $t_2$ 454, first and second signals 422, 424 provided to switch S1 202 and switch S2 204, respectively, leave switch S1 204 and switch S2 204 open for the duration of the second section 408. The third signal 426 provided to switch S3 206 leaves switch S3 206 closed starting at $t_1$ 452 through the second section 408. From $t_1$ 452 to $t_2$ 454, the fourth signal 428 provided to switch S4 208 is a PWM signal that toggles switch S4 open and closed. Thus, in quadrant 3 operation, switches S1 202 and S2 204 remain open, switch S3 206 remains closed, and switch S4 208 is toggled with the PWM signal. The resulting operation of the circuit is analogous to that described above with respect to quadrant 1, with the current passing through capacitor C2 218 through switches S3 206 and S4 208 and the inductor 210, capacitor C3 214, to the output 214 when switch S4 208 is closed. When switch S4 208 is opened, the current freewheels through the inductor 210, capacitor C3 214, diode D2 222, and switch S3 206. The operation of the circuit can be similar to the operation of the circuit in quadrant 1, with opposite polarities.

Figure 5:
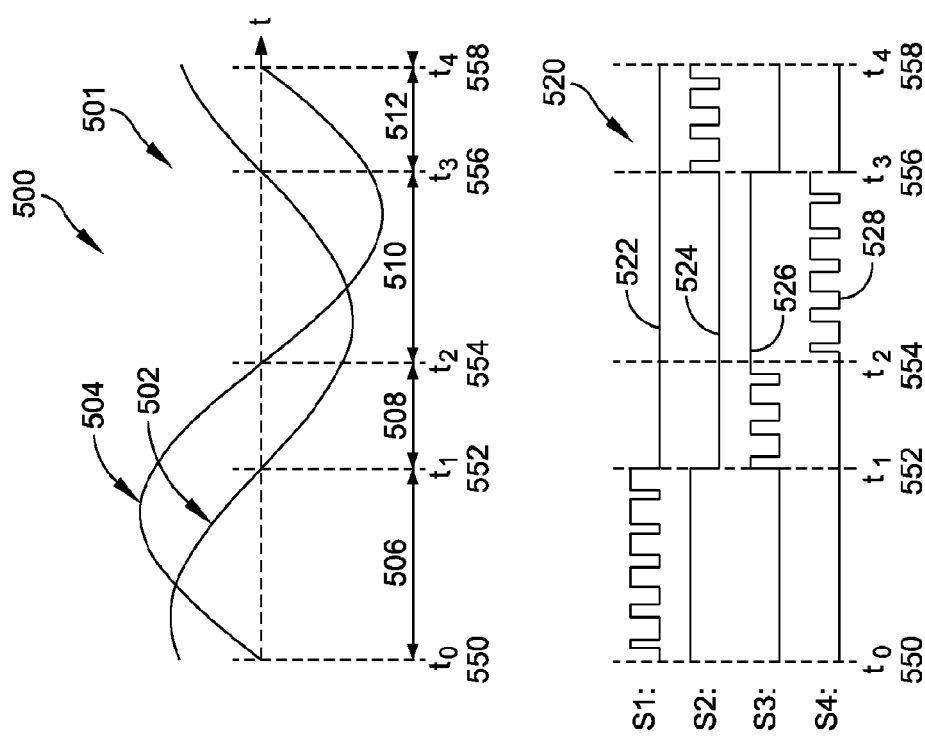
FIG. 5 is a diagram depicting control signals to an inverter of an uninterruptible power supply in accordance with an embodiment.

FIG. 5 is a diagram 500 depicting control signals to an inverter of an uninterruptible power supply in accordance with an embodiment. A graph 501 shows an output current 502 and an output voltage 504 for an example load. For example, the output current 502 and the output voltage 504 can be an example output measured at the output 214 of the inverter 130 of FIG. 2. The example output is for a leading load, providing an output current 502 with a phase that leads a phase of the output voltage 504. A first section 506, from a time $t_0$ 550 to a time $t_1$ 552, shows operation of the inverter 130 in quadrant 1, where the output current 502 and the output voltage 504 both have a positive polarity. A second section 508, from time $t_1$ 552 to a time $t_2$ 554, shows operation of the inverter 130 in quadrant 4, where the output current 502 has a negative polarity and the output voltage 504 has a positive polarity. A third section 510, from time $t_2$ 554 to a time $t_3$ 556, shows operation of the inverter 130 in quadrant 3, where the output current 502 and the output voltage 504 both have a negative polarity. A fourth section 512, from time $t_3$ 556 to a time $t_4$ 558, shows operation of the inverter 130 in quadrant 2, where the output current 502 has a positive polarity and the output voltage 504 has a negative polarity.

A timing diagram 520 shows the control signals provided to the switches S1 202, S2 204, S3 206, and S4 208 to generate the corresponding output current 502 and output voltage 504 shown in the graph 501, according to some embodiments. The first section 506 can be generated by providing signals similar to those described above with regard to quadrant 1 operation in FIG. 4. A first signal 522 is provided to switch S1 202, a second signal 524 is provided to switch S2 204, a third signal 526 is provided to switch S3 206, and a fourth signal 528 is provided to switch S4 208. From $t_0$ 550 to $t_1$ 552, the second signal 524 is high, leaving switch S2 204 on, while the third and fourth signals 526, 528 are low, leaving switches S3 206 and S4 208 off through the duration of the first section 506. The first signal 522 is a PWM signal, toggling switch S1 202 on and off. The operation of the inverter 130 and the path of current through the circuit can be similar to that described above with respect to quadrant 1 operation of the inverter 130.

From $t_1$ 552 to $t_2$ 554, the inverter 130 is controlled to operate in quadrant 4 to power a leading load. In some embodiments, the first signal 522, the second signal 524, and the fourth signal 528 are low signals provided to switch S1 202, switch S2 204, and switch S4 208, respectively, to turn switch S1 202, S2 204, and S4 208 off for the duration of the second section 508. The third signal 526 is a PWM signal provided to switch S3 206 to toggle switch S3 on and off during the second section 508. When switch S3 is on, the current passes through a circuit created from capacitor C3 212 through the inductor 210, switch S3 206 and diode D2 222. During the second section 508, energy is passed from capacitor C3 212 to the inductor 210 and causes the current in the inductor 210 to rise in a negative direction. When switch S3 is off, the current freewheels through capacitor C3 212, the inductor 210, the diodes of switches S1 202 and S2 204, and capacitor C1 216. During the second section 508, the current in the inductor 210 decreases towards zero and can become zero before switch S3 206 turns on again if the inverter 130 is operating in discontinuous conduction mode (DCM). The operation of the circuit can be similar to that of a boost converter.

From $t_2$ 554 to $t_3$ 556, the inverter 130 is controlled to operate in quadrant 3. The signals provided to the switches S1 202, S2 204, S3 206, and S4 208 are similar to those provided in quadrant 3 operation for a resistive load. The first and second signals 522, 524 are low and the third signal 526 is high, turning off switches S1 and S2 202, 204 while turning on switch S3 206. The fourth signal 528 is a PWM signal to toggle switch S4 208 on and off.

From $t_3$ 556 to $t_4$ 558, the inverter 130 operates in quadrant 2, generating a positive output current 502 and a negative output voltage 504. The first signal 522, third signal 526, and fourth signal 528 are low, turning off switches S1 202, S3 206, and S4 208, respectively. The second signal 524 is a PWM signal that toggles switch S2 204 on and off. The resulting operation of the circuit can be analogous to the operation of the inverter 130 in quadrant 4 operation. When switch S2 204 is on, the current in the circuit passes through the inductor 210, capacitor C3 214, diode D1 220, and switch S2 204. When switch S2 204 is off, the current freewheels through capacitor C3 214, the inductor 210, the diodes of switches S3 206 and S4 208, and capacitor C2 218. During the fourth section 512, the current in the inductor 210 increases towards zero and can become zero before switch S2 204 turns on again if the inverter 130 is operating in DCM.

In some embodiments, the PWM signals provided to each of the switches 202, 204, 206, 208 to power a leading load can modulate from a narrower width (a shorter pulse) to a wider width (a longer pulse) in each section 506, 508, 510, 512.

Figure 6:
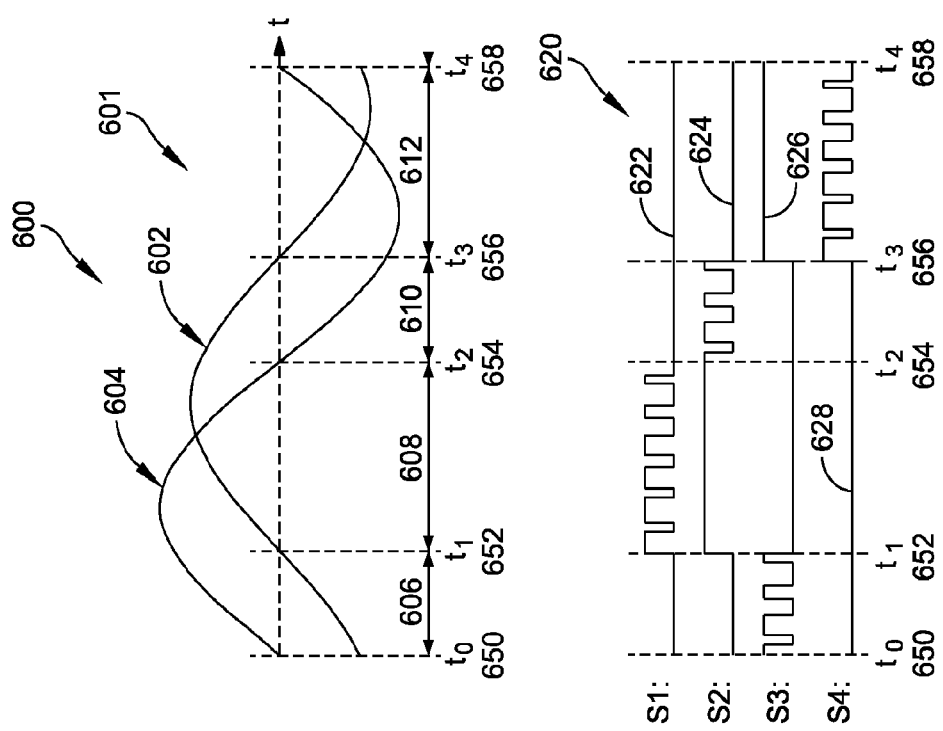
FIG. 6 is a diagram depicting control signals to an inverter of an uninterruptible power supply in accordance with an embodiment.

FIG. 6 is a diagram 600 depicting control signals to an inverter of an uninterruptible power supply in accordance with an embodiment. A graph 601 shows an output current 602 and an output voltage 604 for an example load. For example, the output current 602 and the output voltage 604 can be an example output measured at the output 214 of the inverter 130 of FIG. 2. The example output is for a lagging load, providing an output current 602 with a phase that lags behind a phase of the output voltage 604. A first section 606, from a time $t_0$ 650 to a time $t_1$ 652, shows operation of the inverter 130 in quadrant 4, where the output current 602 has a negative polarity and the output voltage 604 has a positive polarity. A second section 608, from time $t_1$ 652 to a time $t_2$ 654, shows operation of the inverter 130 in quadrant 1, where the output current 602 and the output voltage 504 have a positive polarity. A third section 610, from time $t_2$ 654 to a time $t_3$ 656, shows operation of the inverter 130 in quadrant 2, where the output current 602 has a positive polarity and the output voltage 604 has a negative polarity. A fourth section 612, from time $t_3$ 656 to a time $t_4$ 658, shows operation of the inverter 130 in quadrant 3, where the output current 602 and the output voltage 604 have a negative polarity.

A timing diagram 620 shows the control signals provided to the switches S1 202, S2 204, S3 206, and S4 208 to generate the corresponding output current 602 and output voltage 604 shown in the graph 601, according to some embodiments. A first signal 622 is provided to switch S1 202, a second signal 624 is provided to switch S2 204, a third signal 626 is provided to switch S3 206, and a fourth signal 628 is provided to switch S4 208. In some embodiments, the signals 622, 624, 626, 628 can be similar to those provided for each of the quadrants as described above with reference to FIG. 5. For example, from $t_0$ to $t_1$, as the inverter is operating in quadrant 4, the first, second, and fourth signals 622, 624, 628 can be low while the third signal 626 is a PWM signal, similar to the quadrant 4 operation of the inverter 130 described above.

In some embodiments, the PWM signals provided to each of the switches 202, 204, 206, 208 to power a lagging load can modulate from a wider width (a longer pulse) to a narrower width (a shorter pulse) in each section 606, 608, 610, 612.

Figure 7:
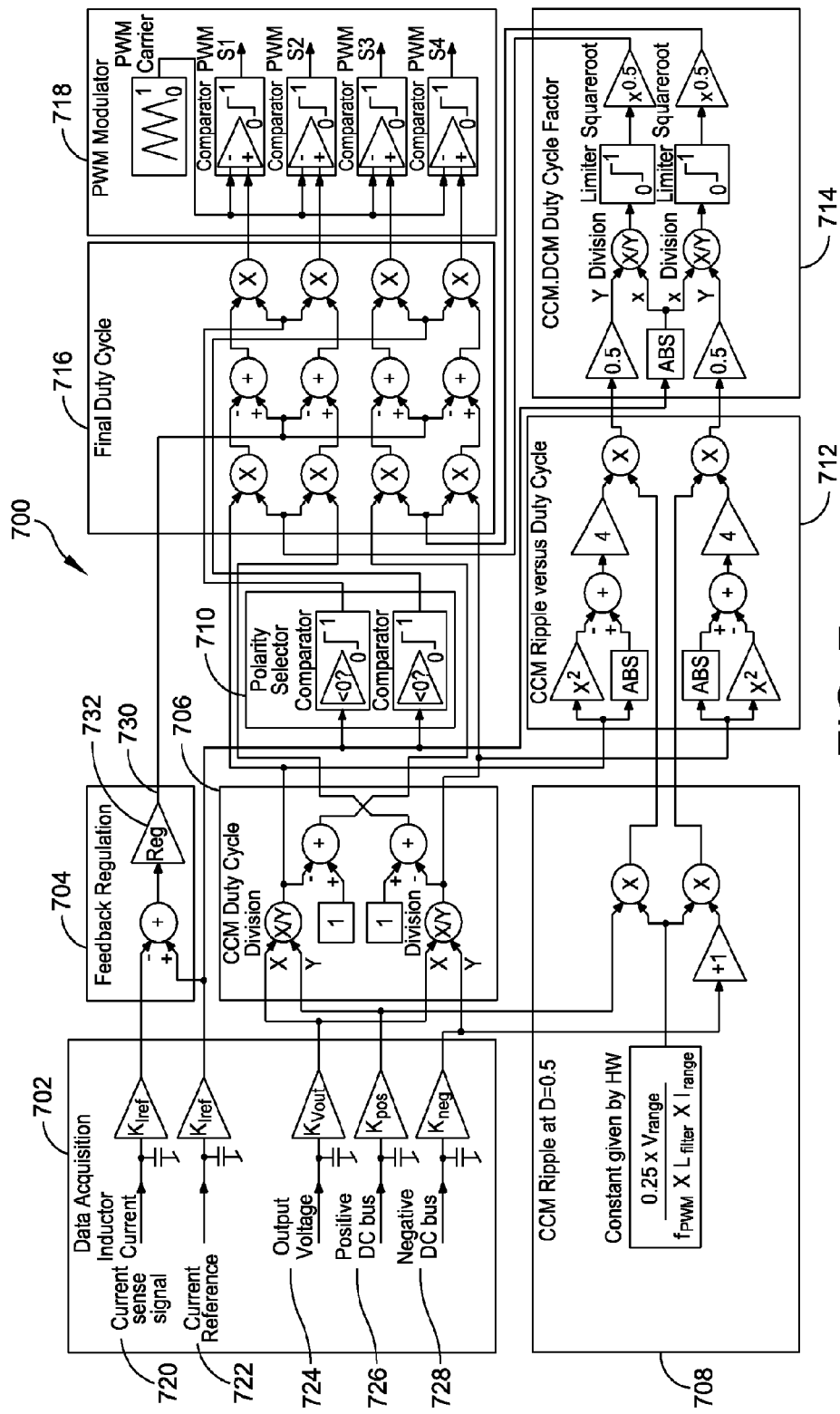
FIG. 7 is a functional block diagram depicting a control algorithm for an uninterruptible power supply in accordance with an embodiment.

FIG. 7 is a functional block diagram 700 depicting a control algorithm for an uninterruptible power supply in accordance with an embodiment. For example, the block diagram 700 can provide control signals to the switches S1 202, S2 204, S3 206, and S4 208 of the inverter 130 of FIG. 2, based on inputs from the inverter 130. In some embodiments, the block diagram 700 includes control blocks that receive inputs, process the inputs, and provide outputs. A data acquisition block 702 receives input signals used to determine the control signals. The data acquisition block 702 receives a current sense signal 720 based on a current detected in the inductor 210. The data acquisition block 702 also receives a current reference 722 from a voltage control loop of the output inverter. The data acquisition block 702 also receives an output voltage 724. The output voltage 724 is a voltage measured at the output 214 of the inverter 130. The data acquisition block 702 also receives a positive DC bus voltage 726 and a negative DC bus voltage 728. The positive DC bus voltage 726 and the negative DC bus voltage 728 can be measured from an output from the rectifier 110 or the backup power source 125 of FIG. 1. The data acquisition block 702 can also provide analog to digital (A/D) conversion of the input signals. Some of the input signals, such as the current reference 722, can be received as a digital signal, in which case analog to digital conversion can be bypassed for such signals.

A feedback regulation block 704 compares the current sense signal 720 to the current reference 722. Based, at least in part, on the difference between the current sense signal 720 and the current reference 722, the feedback regulation block 704 generates a feedback regulation signal 730. The feedback regulation signal 730 can adjust the PWM outputs to minimize the difference between the current sense signal 720 and the current reference 722. The feedback regulation block 704 can use a proportional regulator 732 to generate the feedback regulation signal 730. Alternatively, a proportional-integral regulator or a proportional-integral-differential regulator can also be used.

A continuous conduction mode (CCM) duty cycle block 706 calculates a theoretical duty cycle of the switches S1 202, S2 204, S3 206, and S4 208. The CCM duty cycle block 706 calculates the theoretical duty cycle using formulas known from buck converters and boost converters, including ratios between the output voltage 724 and the positive DC bus voltage 726, and between the output voltage 724 and the negative DC bus voltage 728. The CCM duty cycle block 706 provides four output signals which are further processed to generate the PWM output signals provided to the switches 202, 204, 206, 208.

A CCM maximum ripple block 708 calculates a maximum peak-to-peak ripple of the inverter 130 by calculating a peak-to-peak ripple of the inverter 130 operating in continuous conduction mode with a duty cycle of 0.5 (50%). The CCM maximum ripple block 708 calculates the maximum ripple based on the positive DC bus voltage 726, the negative DC bus voltage 728 and an inverter constant 734. The inverter constant 734 is a constant based on parameters of the hardware of the inverter 130. The inverter constant 734 is determined by a PWM frequency, a value of the inductor 210, and A/D conversion ranges for voltages and currents of the inverter 130. In some embodiments, the inverter constant 734 can be determined using a lookup table.

A polarity selector block 710 determines which switches to turn on based on a polarity of the current reference 722. The polarity selector block 710 enables the switch or switches such that the inductor current is either zero or in the desired direction of the load current.

A CCM adjusted ripple block 712 calculates a peak-to-peak ripple value of a ripple current of the inverter 130 at a given duty cycle. The maximum ripple calculated by the CCM maximum ripple block 708 provides the ripple for the inverter 130 when the duty cycle is at 0.5. As the duty cycle approaches 0 or 1, the peak-to-peak value of the ripple current drops accordingly. The CCM adjusted ripple block 712 calculates an adjusted peak-to-peak ripple current for a given duty cycle, using a CCM operation assumption.

A CCM/DCM duty cycle factor block 714 determines a multiplier to adjust the duty cycle for when the inverter 130 is operating in DCM. The inverter 130 will shift from CCM to DCM when an average current in the inductor 210 is 50% of the peak-to-peak ripple current. In some embodiments, the CCM/DCM duty cycle factor block 714 compares the adjusted peak-to-peak ripple current calculated by the CCM adjusted ripple block 712 multiplied by 0.5 with an absolute value of the current reference 722 and produces a ratio. When the absolute value of the current reference 722 is less than half the adjusted peak-to-peak ripple current, the inverter 130 is operating in DCM and the ratio is less than one. When the absolute value of the current reference 722 is greater than or equal to half the adjusted peak-to-peak ripple current, the inverter 130 is operating in CCM, and the ratio is limited to 1. The ratio is further processed through a square root function to provide the multiplier. The square root function enables a linear behavior of the control loop in DCM.

A final duty cycle block 716 determines the final duty cycles for the switches 202, 204, 206, 208. The final duty cycle block 716 multiplies the output signals generated by the CCM duty cycle block 706 with the multipliers generated by the CCM/DCM duty cycle factor block 714. The output from the feedback regulator block 704 is also added, and the output of the polarity selector block 710 is used to enable the PWM signals for the appropriate switches depending on the polarity of the current.

A PWM modulator block 718 coverts the pulse widths generated by the final duty cycle block 716 into PWM signals with the desired frequency. The PWM modulator block 718 generates the signals provided to the switches S1 202, S2 204, S3 206, and S4 208.

Figure 8:
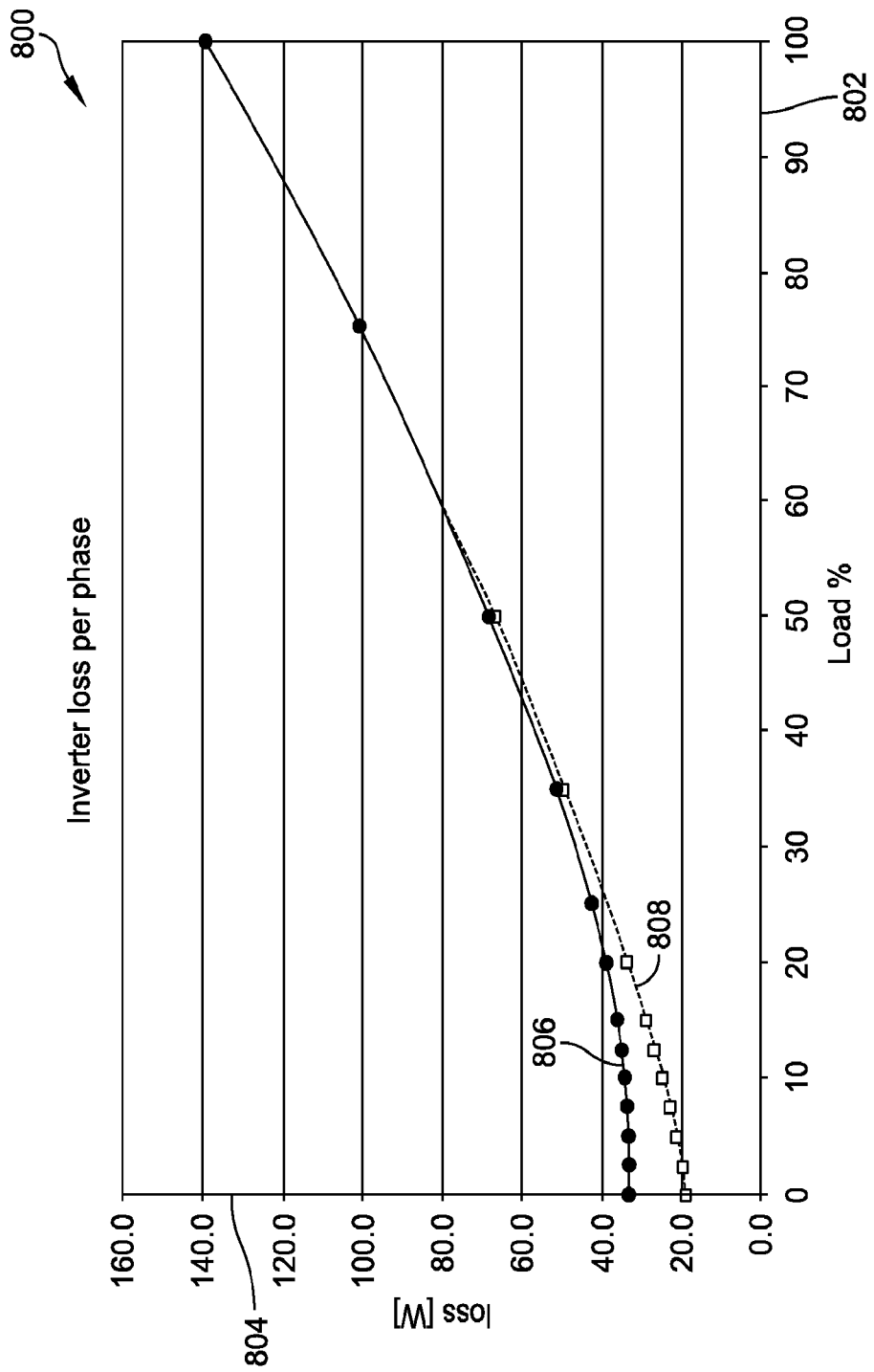
FIG. 8 is a graph depicting inverter loss for an uninterruptible power supply in accordance with an embodiment.

FIG. 8 is a graph 800 depicting inverter loss per phase for an uninterruptible power supply in accordance with an embodiment. An x-axis 802 of the graph 800 shows a percentage load, ranging from zero to 100. A y-axis 804 of the graph 800 shows a power loss in watts. A first curve 806 plots data points for an example control method according to the prior art, for example, as shown with reference to FIG. 3A. A second curve 808 plots data points for an example control method in accordance with some embodiments described herein. The graph 800 shows lower power losses for the control method in accordance with some described embodiments, especially at lower load percentages. The load currents at lower load percentages are closer to zero, and thus would exhibit a greater difference between the CCM and DCM modes of operation, leading to a greater efficiency.

Figure 9:
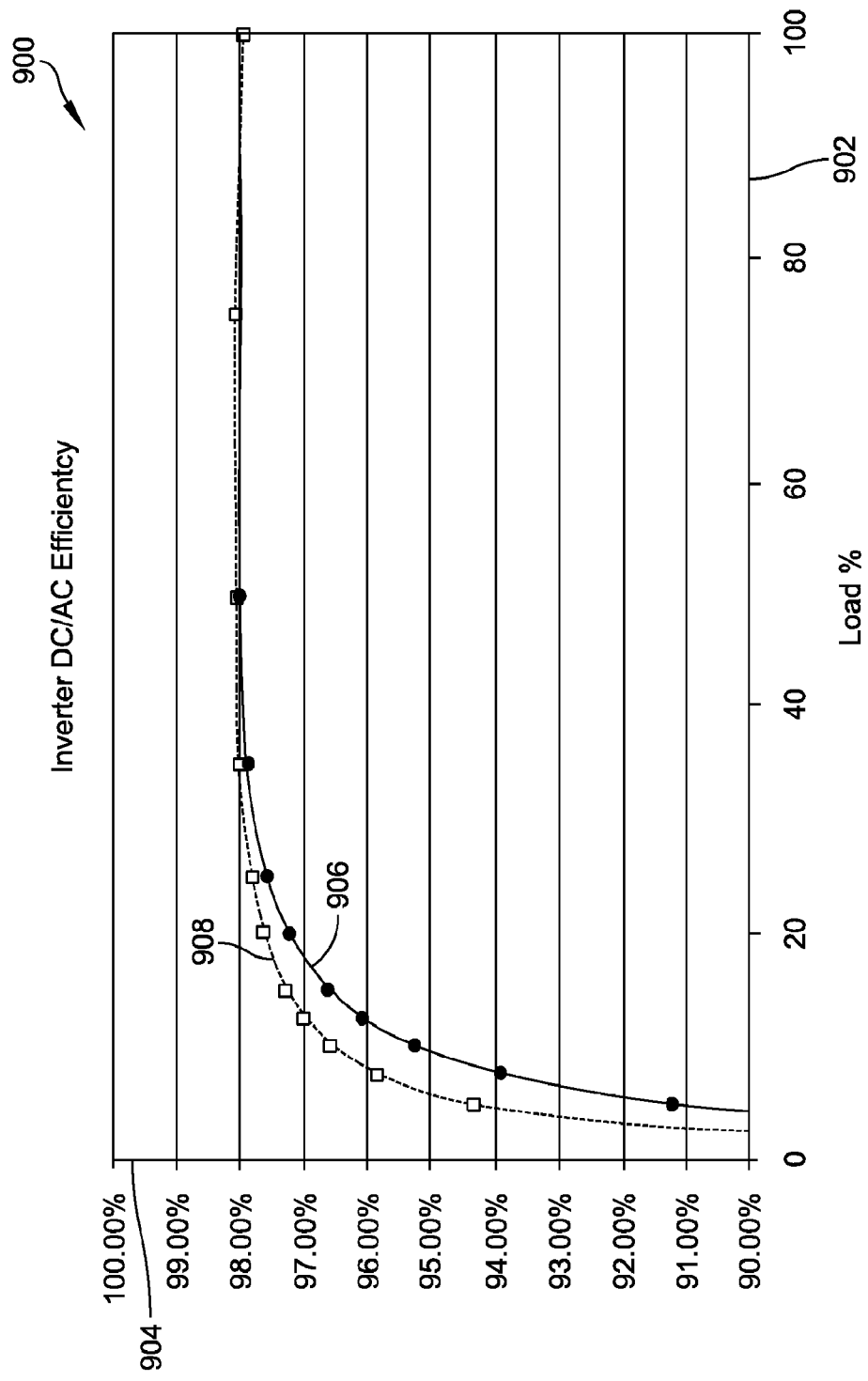
FIG. 9 is a graph depicting inverter efficiency for an uninterruptible power supply in accordance with an embodiment.

FIG. 9 is a graph 900 depicting inverter DC/AC efficiency for an uninterruptible power supply in accordance with an embodiment. An x-axis 902 of the graph 900 shows a percentage load, ranging from zero to 100. A y-axis 904 of the graph 900 shows a percentage power efficiency, ranging from 90 to 100. A first curve 906 plots data points for an example control method according to the prior art, for example, as shown with reference to FIG. 3A. A second curve 908 plots data points for an example control method in accordance with some embodiments described herein. The graph 900 shows greater efficiency for the control method in accordance with some described embodiments, again at the lower load ranges, as less power is lost to inductor current with opposite polarities to load currents.

Figure 10:
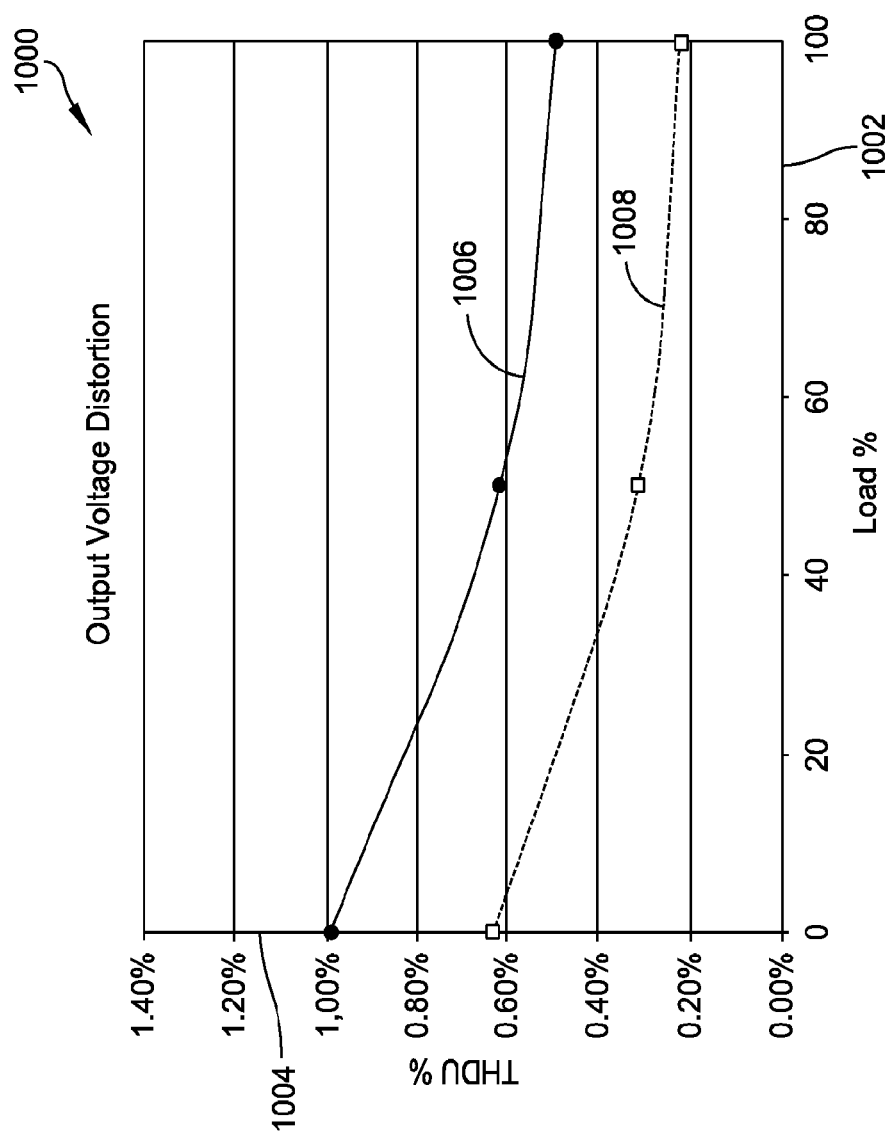
FIG. 10 is a graph depicting output voltage distortion for an uninterruptible power supply in accordance with an embodiment.

FIG. 10 is a graph 1000 depicting output voltage distortion for an uninterruptible power supply in accordance with an embodiment. An x-axis 1002 of the graph 1000 shows a percentage load, ranging from zero to 100. A y-axis 1004 of the graph 900 shows a percentage total harmonic distortion, ranging from zero to 1.4. A first curve 1006 plots data points for an example control method according to the prior art, for example, as shown with reference to FIG. 3A. A second curve 1008 plots data points for an example control method in accordance with some embodiments described herein. The graph 1000 shows lower total harmonic distortion across all load percentages for the control method in accordance with some described embodiments.

While the embodiments described above have been described with reference to an inverter, similar methods and techniques can be applied for any appropriate bi-directional converters, including DC-to-AC converters (inverters) and AC-to-DC converters (rectifiers). While the embodiments described above have been described with reference to a 3-level inverter, similar methods and techniques can be applied for any appropriate topologies, including 2-level, 3-level, or multilevel converters and for single-phase and three-phase UPSs.

Having now described some illustrative embodiments, it is apparent that the foregoing is illustrative and not limiting, having been presented by way of example. In particular, although many of the examples presented herein involve specific combinations of method acts or system elements, it is understood that those acts and those elements may be combined in other ways to accomplish the same objectives. Acts, elements and features discussed only in connection with one embodiment are not intended to be excluded from a similar role in other embodiments.

Note that in FIGS. 1 through 10, the enumerated items are shown as individual elements. In actual implementations of the systems and methods described herein, however, they may be inseparable components of other electronic devices such as a digital computer. Thus, actions described above may be implemented at least in part in software that may be embodied in an article of manufacture that includes a program storage medium. The program storage medium includes non-transitory and other data signals embodied in one or more of a carrier wave, a computer disk (magnetic, or optical (e.g., CD or DVD, or both)), non-volatile memory, tape, a system memory, and a computer hard drive.

From the foregoing, it is appreciated that the systems and methods for distributing power provided by the uninterruptible power supply described herein afford an elegant and effective way to distribute power to a UPS output, where it can be applied to a load. The systems and methods can operate during UPS bypass conditions, where inverters can be kept on and idling, which increases efficiency and lowers cost.

Any references to front and back, left and right, top and bottom, or upper and lower and the like are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects and embodiments disclosed herein.

References to "or" may be construed as inclusive so that any terms described using "or" may indicate any of a single, more than one, and all of the described terms. Intervening embodiments, acts, or elements are not essential unless recited as such. Any solution to a problem, or any element or act presented herein in the alternative, for example using the word "or," is neither ambiguous nor indirect simply because it may be presented in the alternative. Any such alternative embodiments, solutions, elements, or acts are derivable directly and unambiguously as at least one embodiment independent of any other alternative solutions, elements, or acts.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

One skilled in the art will realize the systems and methods described herein may be embodied in other specific forms without departing from the characteristics thereof. For example, the uninterruptible power supply can be a single phase or three phase uninterruptible power supply. Further, couplings between uninterruptible power supply components include direct couplings and indirect couplings where intervening elements may be present. The controller 120 can include combinations of hardware, software, and firmware, as well as application specific integrated circuits, programmable logic devices, and processors. Input power can be provided by the AC power source, or any second or backup power source, and combinations thereof. Embodiments described with input power from any of these sources may encompass variations thereof where power is provided at least in part from another of these sources. The inverter can have different topologies, and can include two-level and three-level inverters and other topologies or multilevel topologies including four level topologies. The foregoing embodiments are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. An uninterruptible power supply, comprising:
an input configured to receive input power;
an output;
a power conversion circuit coupled with the input and the output;
a controller coupled with the power conversion circuit;
the power conversion circuit comprising an inverter;
the inverter comprising a low pass filter;
the low pass filter comprising an inductor; and
the controller configured to provide control signals to the inverter such that a first current, measured at the inductor, generates a second current at the output having an output waveform, the first current having a first polarity and the second current having a second polarity, wherein the first polarity is either zero or the same polarity as the second polarity over a complete cycle of the output waveform.

2. The uninterruptible power supply of claim 1, wherein the control signals comprise pulse width modulated (PWM) signals.

3. The uninterruptible power supply of claim 2, wherein the inverter is configured to operate in a discontinuous conduction mode when an average current of the second current is less than a predetermined threshold.

4. The uninterruptible power supply of claim 2, wherein the inverter is configured to operate in any of four quadrants.

5. The uninterruptible power supply of claim 4, wherein the control signals comprise four signals, each provided to one of four switches included in the inverter, respectively.

6. The uninterruptible power supply of claim 5, wherein one of the four signals is a PWM signal, and the other three of the four signals are constant signals, the PWM signal alternating among the four signals.

7. The uninterruptible power supply of claim 1, further comprising:
a control switch coupled to the controller and the inverter; and
a backup power source coupled to the control switch, wherein the controller is configured to control the control switch to provide power to the inverter from at least one of the input and the backup power source.

8. The uninterruptible power supply of claim 7, further comprising a bypass switch coupled to the controller and configured to couple the input to the output in a bypass mode of operation of the uninterruptible power supply, wherein the inverter is configured to operate in a discontinuous conduction mode in the bypass mode of operation.

9. The uninterruptible power supply of claim 1, wherein the power conversion circuit is configured to provide reduced harmonic distortion.

10. A method of distributing power using an uninterruptible power supply comprising an input, an output, and a power conversion circuit comprising an inverter comprising an inductor, the method comprising:
controlling the inverter such that a first current, measured at the inductor, generates a second current at the output having an output waveform, the first current having a first polarity and the second current having a second polarity,
wherein the first polarity is either zero or the same polarity as the second polarity over a complete cycle of the output waveform.

11. The method of claim 10, wherein controlling the inverter includes providing pulse width modulated (PWM) signals to the inverter.

12. The method of claim 11, wherein the inverter is configured to operate in a discontinuous conduction mode when an average current of the second current is less than a predetermined threshold.

13. The method of claim 11, wherein the inverter is configured to operate in any of four quadrants.

14. The method of claim 13, wherein controlling the inverter includes providing four signals, each provided to one of four switches included in the inverter, respectively.

15. The method of claim 14, wherein one of the four signals is a PWM signal, and the other three of the four signals are constant signals, the PWM signal alternating among the four signals.

16. The method of claim 10, the uninterruptible power supply further comprising a control switch and a backup power source, the method further comprising controlling the control switch to provide power to the inverter from at least one of the input and the backup power source.

17. The method of claim 16, the uninterruptible power supply further comprising a bypass switch configured to couple the input to the output in a bypass mode of operation of the uninterruptible power supply, the method further comprising controlling the inverter to operate in a discontinuous conduction mode in the bypass mode of operation.

18. The method of claim 10, further comprising controlling the power conversion circuit to provide reduced harmonic distortion.

19. A system for distributing power with an uninterruptible power supply, comprising:
an input configured to receive input power;
an output;
a power conversion circuit coupled with the input and the output;
the power conversion circuit comprising an inverter;
the inverter comprising a low pass filter;
the low pass filter comprising an inductor; and
means for controlling the inverter such that a first current, measured at the inductor, generates a second current at the output having an output waveform, the first current having a first polarity and the second current having a second polarity, wherein the first polarity is either zero or the same polarity as the second polarity over a complete cycle of the output waveform.

* * * * *